United States Patent [19]
Douglas et al.

[11] Patent Number: 5,951,901
[45] Date of Patent: Sep. 14, 1999

[54] STEAM CONTROL FOR COMBINATION OVEN AND STEAMER

[75] Inventors: Scott Douglas, Burlington; Jonathon Haas, Colchester; Charles Kingdon, Vergennes, all of Vt.

[73] Assignee: G.S. Blodgett Corp., Burlington, Vt.

[21] Appl. No.: 09/080,277

[22] Filed: May 18, 1998

Related U.S. Application Data

[63] Continuation-in-part of application No. 08/961,986, Oct. 31, 1997.

[51] Int. Cl.$^6$ .................................................. H05B 1/02
[52] U.S. Cl. ............................................. 219/519; 126/20
[58] Field of Search ................................. 219/519, 492, 219/508, 497, 494, 518; 126/20, 273 R; 292/304, 229; 49/503, 394

[56] References Cited

U.S. PATENT DOCUMENTS

| | | |
|---|---|---|
| 4,506,598 | 3/1985 | Meister . |
| 4,641,630 | 2/1987 | Meister . |
| 4,698,487 | 10/1987 | Meister . |
| 4,700,685 | 10/1987 | Miller ........................................ 126/20 |
| 4,742,847 | 5/1988 | Meister . |
| 5,619,983 | 4/1997 | Smith . |
| 5,679,274 | 10/1997 | Mahood .................................. 219/492 |
| 5,739,504 | 4/1998 | Lyons et al. ............................ 219/494 |
| 5,880,438 | 3/1999 | Parrini et al. ........................... 219/519 |

*Primary Examiner*—Teresa Walberg
*Assistant Examiner*—Jeffrey Pwu
*Attorney, Agent, or Firm*—Donald C. Casey, Esq.

[57] ABSTRACT

A control system for steam production in a oven combination is described. The control is adapted for use with a single source of steam and a plurality of oven cavities wherein cooking is achieved by a combination of convection oven and steam heat or by steam alone. The control system activates steam production in response to a temperature requirement for a particular oven and opens a valve permitting the inflow of steam into that oven alone. The control system can also be used to admit steam simultaneously to all oven cavities if required.

8 Claims, 1 Drawing Sheet

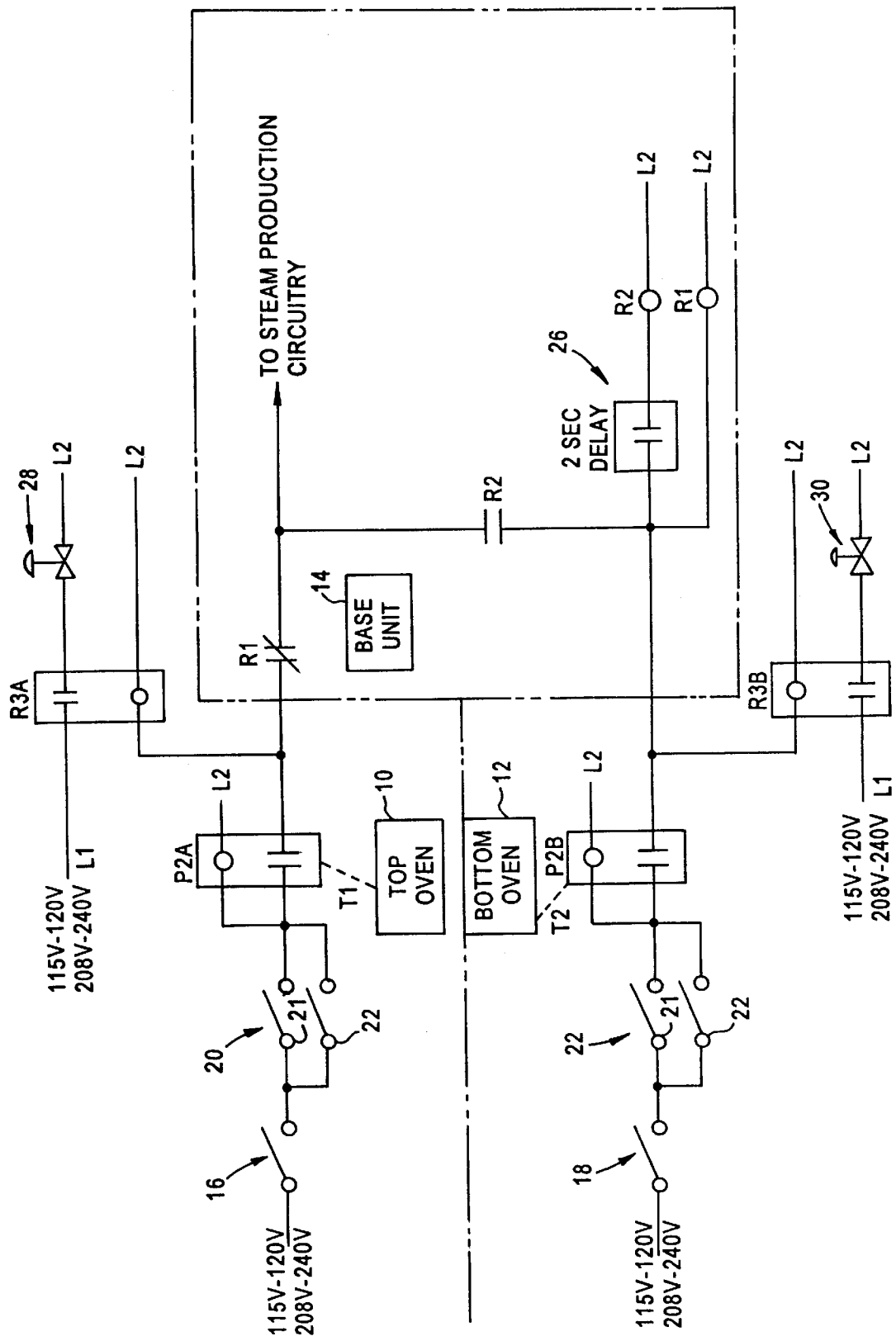

STEAM CONTROL FOR COMBINATION OVEN AND STEAMER

A CROSS-REFERENCE TO THE RELATED APPLICATIONS

This application is a Continuation-in-Part to our patent application Ser. No. 08/961,986 filed Oct. 31, 1997 entitled "Combination Steamer and Convection Oven with Double Doors". The disclosure of this parent application is hereby incorporated by reference.

FIELD OF THE INVENTION

This invention relates to a combination steamer and convection oven, and in particular, to a steam control for such ovens to permit the safe and efficient utilization of a single source of steam for multiple combination convection and steamer ovens.

DESCRIPTION OF THE PRIOR ART

Combination convection and steamer ovens have been known for many years and are in commercial use today. Examples of such ovens are identified in our parent patent application which relates to a pair of said ovens which utilize a single source of steam.

Typical prior art ovens which utilize either convection currents or steam, or a combination thereof to cook food have a single cooking cavity and a single external source of steam. See for example U.S. Pat. No. 5,619,983. In such combination steam and convection ovens various types of controllers are known to program when a convection oven feature is used alone, when the steamer feature is used alone, and when the two are used in sequence. Obviously, these functions could also be controlled manually. In U.S. Pat. No. 5,619,983 such an oven is described wherein a sensor is designed to monitor the heat conditions within the oven and supply steam in accordance with optimum cooking conditions.

In many fast food type or other commercial restaurant facilities it is desirable to have multiple ovens or multiple cooking cavities, and with kitchen floor space often at a premium such ovens are often stacked. In our above identified patent application a stacked pair of such ovens was described, and of the close proximity of cooking cavities, it was feasible to use a single source of steam for both cavities.

In such a dual oven situation however control of the steam function is difficult. Control is necessary to insure that optimal cooking conditions are occurring in each cavity, and that such conditions in one cavity are independent from those in the other. Furthermore, it is desirable that the oven combination have sufficient safeguards to avoid operator mistakes such as admitting steam to an oven cavity when convection heating only is called for, or the opposite, failure to admit steam when steam is called for.

Although the above identified parent application is directed to stackable oven units having double doors for the cooking cavity to thereby minimize the kitchen space necessary to accommodate the doors, steam control is a common control problem not dependent on whether the oven has a single door or double doors.

It is necessary then to develop a control system for a plurality of cooking cavities which are serviced by a single source of steam so that optimum cooking conditions can be maintained without mistakes occurring.

In a combination convection and steamer ("Combi") oven there is generally described two modes of operation. In a first operating phase, useful for thawing, heating, and cooking food products, a separate boiler is energized and the necessary amount of steam admitted to the heating cavity where the steam condenses onto contents of the cooking space. The condensed water and juices are then drained from the cooking cavity.

In a second operating phase for roasting and baking food a second heating apparatus is switched on and heating elements which surround a fan heat air which is then circulated into the heating cavity. The food stuffs are then cooked by convection and the juices are drained by the same conduit drain used in the steam phase. The oven then includes a blower wheel which is used to circulate either steam or hot air and a separate steam generator and temperature regulator with a control vent. In certain instances, however, it is desirable to cook with steam alone either at atmospheric pressure or at a pressure above or below atmospheric. In the latter instance a vacuum pump can be included. If it is desired to super heat the steam the vent from the heating cabinet can be restricted and additional heat supplied by the heating radiants used in the convection phase. See for example the "Combi" ovens described in U.S. Pat. No. 4,506,598 and related U.S. Pat. Nos. 4,641,630; 4,698,487; and 4,742,847, the disclosures of which are hereby incorporated by reference.

Oven control then in the commercial environment is further complicated when two or more oven units are used, preferably in a stacked configuration, with a single external source of steam. While the individual controls for "Combi" ovens are known, and individual controls for steamers are known, a fail safe control facility is necessary if more than one heating cavity is served by a single source of steam to insure against mistakes.

SUMMARY OF THE INVENTION

It has been discovered however that a control system can be designed for a steamer configuration using a plurality of oven cavities and a single source of steam wherein the oven cavities are used either in a "Combi" mode or in a steamer mode. In the oven combination of this invention, circuitry allows discrete, oven steam inlet valves to operate only in a predetermined manner. A separate steam production board is provided for each oven with an associated heat sensing thermistor in the oven wherein the circuitry permits current to flow to energize steam production and to simultaneously open the steam valve for a particular oven cavity and wherein a back feed is prevented to ensure that power does not flow backward to open the wrong steam valve and the wrong time.

The control system of this invention then permits the operation, in a stacked pair of ovens, of either as a single oven or operation of both ovens simultaneously, on either the "Combi" or steamer mode, by controlling the production of steam, and separately controlling the valves opening into the oven cavities to control access to the cavities from the steam production facility.

Accordingly it is an object of this invention to provide a control system for steam control in a cooking facility wherein at least two oven cavities are served by a single external source of steam.

It is yet another object of this invention to provide a control system for steam control in a combination convection and steamer oven with a steamer oven mode wherein the admission of steam to a particular oven cavity is prevented unless the mode of operation of that cavity calls for steam.

It is still another object of this invention to provide a control system for "Combi" steamer oven cavities served by a single source of steam that will prevent inadvertent opening of a steam admission valve to a particular oven cavity unless the mode of operation calls for such.

These and other objects will become readily apparent with reference to the drawings and following description wherein:

BRIEF DESCRIPTION OF THE DRAWINGS

The FIGURE is a schematic representation of the steam control system of this invention for two oven cavities with a single source of steam therefor.

DETAILED DESCRIPTION OF THE INVENTION

The control system of this invention is intended for oven cavities which are capable of operating in a "Combi" mode as described for example in U.S. Pat. No. 4,506,598 and the related patents described above. The "Combi" function includes a steam mode and therefore the control system of this invention will be equally applicable whether the steam function of the "Combi" mode is used or whether the oven cavity functions as a steamer alone. Also, the control system of this invention will be described in relation to a pair of oven cavities (typically stacked) but it will be obvious to those skilled in the art that the principles described herein will be applicable to a plurality of two or more oven cavities served by a single source of steam and the invention is not intended to be limited to two of such cavities.

With attention to the drawing, there is identified a top oven 10 and a bottom oven 12 with a separate steam base unit 14 shown schematically. This could be the device shown in our parent patent application.

The source of electricity for the system of this invention is shown at L1 and L2 as 115–120 volt, or 208–240 volt circuits. The top and bottom oven cavities 10 and 12 have respective door switches 16 and 18 so that the current on line L1 cannot be admitted to the system until the oven door has been closed. Immediately downstream of the oven door, switches 16 and 18, are respective mode switches 20 and 22 for the mode of operation of the top and bottom ovens, 10 and 12, between a steam mode and a "Combi" mode. Schematically a separate switch is shown for each of said modes. For example, the steam switch identified by reference number 21, when closed, causes the cavity controlled by the switch to operate as a steamer which will be subsequently described. Similarly when switch 22 is closed the cavity operates as a "Combi" oven, combing a steam sequence and a convection oven sequence.

Downstream of said mode switches 20 and 22 are provided logic board relays P2A and P2B. Electrical line L2 is shown as a return from the electrical circuit.

Downstream of said logic board relays P2A and P2B are a normally closed relay R1, and a normally open relay R2, and a delayed timer 26 on the coil portion of the relay R2. Relay R1 and relay R2 then are normally opposite in that when R1 is closed R2 is open and when R2 is closed R1 is open with the two second time delay built into relay R2.

Finally relays R3A and R3B control the normally closed steam valves 28 and 30 operative between the steam generating base unit 14 and respectfully the top oven cavity 10 and the bottom oven cavity 12. Accordingly, when steam is required in oven 10, relay P2A functions to initiate steam production circuitry and to open valve 28. Similarly when steam production is needed in the bottom unit 12 relay P2B functions accordingly with valve 30.

For example when the top oven 10 is operating as a single oven the oven cavity calls for steam via thermistor T1, and P2A steam production board. The relay contacts on the steam production board P2A close allowing power to travel through the normally closed contacts of relay R1 and on to energize steam production and to the coil of the normally closed steam valve 28 located in the oven 10 to open the steam valve allowing steam into the cavity.

Similarly, when the bottom unit 12 operates as a single oven, and the oven cavity calls for steam via thermistor T2 and P2B steam production board, the relay contacts close on the steam production board P2B allowing power to travel into the following areas of the circuit: the relay R1 coil is energized to open the normally closed contact of R1; up to and through the two second timer delay 26, current travels to energize the coil of R2; through the now closed but normally open contacts of relay of R2, current flows to energize the steam production circuitry; and finally, current flows to the coil of the normally closed steam valve 30 to open the same and admit steam to the oven cavity.

When both ovens operate simultaneously and both ovens call for steam via steam production boards P2A and P2B power flows to the two second delay timer 26 and subsequently the coil of R1 is energized to open the normally closed contacts. Power flows to each oven section steam valves 28 and 30 to open them, and when the two second timer delay 26 times out and closes, power is allowed to energize the coil R2 whereby the R2 contacts close allowing the power to travel through the R2 contacts and on to the steam production circuitry.

When, for example, the top oven 10 ends its call for steam, the contacts at P2A open ending power that was energizing the steam valve and the steam valve shuts. Steam production would then continue at the bottom oven. If the bottom oven drops out by ending its call for steam the coil of R1 is de-energized closing the contacts of R1 and allowing the top oven to take over steam production if this is necessary. The coil of R2 is de-energized opening contacts R2 and this prevents back feed from the top oven to components of the bottom oven through the steam valve 30.

Accordingly, the control system of this invention then provides a simple and efficient fail safe using conventional relays and circuitry whereby steam can be admitted or the steam production terminated in either or both oven cavities when a pair of oven cavities are provided with a single source of steam. The mode of operation for both cavities is separately controlled in the conventional fashion by both modes which are between steam and "Combi" modes, and whether steam is admitted in the steamer mode or steam is admitted in the "Combi" mode, the call for steam is treated the same by the respective logic board relay for each oven. The vent control for each oven, timer and temperature control preferably are conventional. The system of this invention is designed to ensure that the flow of steam will circulate through the correct oven and terminate accordingly to a pre-selected program without individual manual intervention so that the system of this invention is particularly well suited to a commercial restaurant or fast food kitchen facility.

It will be readily seen by one of ordinary skill in the art that the present invention fulfills all of the objects set forth above. After reading the foregoing specification, one or ordinary skill will be able to effect various changes, substitutions or equivalents and various other aspects of the invention as broadly disclosed herein. It is therefore intended that the protection granted hereon be limited only be the definition contained in the appended claims and equivalents thereof.

What is claimed:

1. Method for controlling steam production in a combination oven and steamer system wherein a plurality of oven cavities are supplied from a common source of steam production comprising the steps of providing at least a first and a second oven cavity, each oven cavity having an operative mode as a convection oven-steamer or as a steamer; providing a single source of steam production in separate communication with each respective cavity; providing first and second normally closed valves controlling communication between said source and each of said respective cavities; providing a first and a second temperature sensor in each of said respective cavities; and providing first and second steam production boards coupled to said respective sensors, valves and to said source of steam sensing a temperature requirement in one of said cavities and recognizing the same at its respective board; activating steam production; opening only the valve controlling communication between said one cavity and the steam production associated with said board while maintaining the other valve in a closed condition.

2. The method of claim 1 wherein the step of activating steam production further comprises:

providing a source of electrical energy coupled to said first and second production boards; providing a first relay controlled couple between said first board and said source of steam production and a second relay controlled couple between said second board and said source of steam production wherein said first relay is normally closed and said second is normally open; and activating said steam production by energizing said first board and first relay without closing said second relay.

3. The method of claim 1 wherein the step of activating steam production further comprises: providing a source of electrical energy coupled to said first and second production boards and providing first and second relay controlled couples between, respectively, said first board and said source of steam production and the second board and said source of steam production wherein said first relay is normally closed and said second relay is normally open; energizing said first couple to open said first relay and said second couple to close said second relay; without opening the first steam valve and opening the second steam valve to admit steam to said second cavity.

4. The method of claim 1 further comprising: sensing a temperature requirement in both cavities and recognizing the same at its respective board; providing a source of electrical energy coupled to said first and second production boards; providing a first, normally closed, relay controlled couple between said first board and said source of steam production and a second, normally open, relay controlled couple between said second board and said source of steam production; energizing said first couple to open and subsequently energizing said second couple to close the second relay, and energizing said valves to open both of said valves.

5. The method of claim 4 further comprising providing a time delay between when the said first couple is energized and when the second relay is closed.

6. The method of claim 4 further comprising simultaneously energizing said first and second couples to open said normally closed first relay and close said second relay after a delay of a predetermined period of time, and subsequently, activating said steam production through said second relay controlled couple.

7. The method of claim 1 wherein the step of recognizing a temperature requirement at a respective board further comprises the step of opening the normally closed cavity steam valve associated with said board, or closing the valve if said valve is open.

8. The method of claim 7 wherein each board is electrically coupled to its respective valve and a source of electrical energy is provided so that the step of opening the valve includes energizing the couple.

* * * * *